(12) United States Patent
Brown (10) Patent No.: US 6,390,278 B1
(45) Date of Patent: May 21, 2002

(54) TRANSFER MECHANISM FOR MULTIPLE LEVEL CONVEYOR

(76) Inventor: Edmund W. Brown, 8715 Gittings Rd., Racine, WI (US) 53406

( * ) Notice: Subject to any disclaimer, the term of this patent is extended or adjusted under 35 U.S.C. 154(b) by 0 days.

(21) Appl. No.: 09/649,835

(22) Filed: Aug. 29, 2000

(51) Int. Cl.$^7$ ............................................... B65G 47/34
(52) U.S. Cl. .................. 198/463.3; 198/589; 198/369.2; 193/35 SS
(58) Field of Search ................... 198/589, 592, 198/369.2, 463.3, 861.3, 861.5, 435; 193/35 SS, 35 A (56) References Cited

U.S. PATENT DOCUMENTS

| | | | |
|---|---|---|---|
| 1,912,898 A | * 6/1933 | Jennings et al. | 198/463.3 X |
| 2,993,582 A | * 7/1961 | Souser | 198/463.3 |
| 3,403,799 A | 10/1968 | Sindzinski et al. | 214/89 |
| 3,623,617 A | 11/1971 | Nemessanyl | 214/1 D |
| 3,848,726 A | 11/1974 | Wiemer | 198/108 |
| 4,282,964 A | * 8/1981 | Hogenkamp et al. | 198/369.2 X |
| 4,595,330 A | 6/1986 | O'Brien et al. | 414/276 |
| 4,815,914 A | 3/1989 | O'Brien et al. | 414/276 |
| 4,909,697 A | 3/1990 | Bernard, II et al. | 414/331 |
| 4,977,999 A | * 12/1990 | Smock | 193/35 SS X |
| 5,078,255 A | 1/1992 | Haley | 198/358 |
| 5,476,180 A | 12/1995 | Konstant | 211/151 |
| 5,513,936 A | 5/1996 | Dean | 414/273 |
| 5,605,427 A | 2/1997 | Hammond | 414/276 |
| 5,617,961 A | 4/1997 | Konstant et al. | 211/151 |
| 5,692,593 A | 12/1997 | Ueno et al. | 198/369.2 |
| 5,727,669 A | 3/1998 | Rich, Jr. | 198/468.6 |
| 6,269,938 B1 | * 8/2001 | Lutz | 198/589 X |

* cited by examiner

Primary Examiner—James R. Bidwell
(74) Attorney, Agent, or Firm—Boyle Fredrickson Newholm Stein & Gratz S.C.

(57) ABSTRACT

A transfer mechanism is provided for transferring a load between an upper conveyor extending along a first axis and a lower conveyor extending along a second axis, vertically displaced from the first axis. The transfer mechanism includes first and second spaced, generally parallel rails having first ends pivotably mounted to the upper conveyor and opposite second ends. The rails are movable between a first position wherein the rails are generally co-planar with the upper conveyor and a second position wherein the rails extend from the upper conveyor at a predetermined angle. A transfer conveyor has a first end pivotably mounted to the second ends of the rails and a second opposite end. The transfer conveyor is movable between a first position wherein the transfer conveyor is generally co-planar with the rails and a second position wherein the transfer conveyor is at a predetermined angle to the rails such that the transfer conveyor is co-planar with the lower conveyor when the rails and the transfer conveyor are in the second positions.

21 Claims, 8 Drawing Sheets

TRANSFER MECHANISM FOR MULTIPLE LEVEL CONVEYOR

FIELD OF THE INVENTION

This invention relates generally to conveyors, and in particular, to a transfer mechanism for transferring a load between an upper conveyor and a lower conveyor.

BACKGROUND AND SUMMARY OF THE INVENTION

In order to transport materials and products throughout a factory or the like, conveyors are often used. Due to the floor space limitations in many factories, pairs of conveyors are often disposed in a vertically spaced relationship. For example, a delivery conveyor may be provided to deliver pallets or containers to a work station and a distribution conveyor, vertically spaced from the delivery conveyor, may be provided to transport such pallets or containers from the work station.

In order to convey the pallets or containers from the upper conveyor to the lower conveyor, complex load transfer mechanisms have been developed. These types of load transfer mechanisms often incorporate various types of hydraulic systems for raising and/or lowering the load between the delivery conveyor and the distribution conveyor. As such, these types of load transfer mechanisms are highly complicated and quite expensive.

Alternatively, simple mechanical types of load transfer mechanisms have been developed which allow a pallet or container to be transferred between an upper conveyor and a lower conveyor. By way of example, Konstant et al., U.S. Pat. No. 5,617,961 discloses a load transfer and return storage rack system which allows for wheel carts or empty pallets to be selectively or automatically transferred from a pair of feed rails to a pair of return rails. The system disclosed in the Konstant et al., '961 patent is intended to transfer empty carts or pallets between the feed rails and the return rails. As such, the system disclosed in the Konstant et al., '961 patent is not intended to deliver product to or distribute the product from a work station at the load transfer structure. Further, no mechanism is provided for dampening the movement of the load transfer system between the feed rails and the return rails. As such, transfer of a loaded cart or pallet between the feed rails and the return rail may cause damage to the load transfer system disclosed in the Konstant et al. '961 patent.

Therefore, it is a primary object and feature of the present invention to provide a transfer mechanism for transferring a load between a first upper conveyor and a second lower conveyor.

It is a further object and feature of the present invention to provide a transfer mechanism which transfers a load between a first upper conveyor and a second lower conveyor and which provides for an intermediate position during transfer of the load wherein the load is in an ergometrically friendly position at a work station.

It is a still farther object and feature of the present invention to provide a transfer mechanism which transfers a load between a first upper conveyor and a second lower conveyor which is simple and inexpensive to manufacture.

In accordance with the present invention, a transfer mechanism is provided for transferring a load between a first upper conveyor and a second lower conveyor. The transfer mechanism includes first and second spaced, generally parallel rails having first lends pivotably mounted to the upper conveyor and opposite, second ends. The rails are movable between a first position wherein the rails are generally co-planar with the upper conveyor and a second position wherein the rails extend from the upper conveyor at a predetermined angle. The transfer mechanism also includes a transfer conveyor having a first end pivotably mounted to the second ends of the rails, and a second opposite end. The transfer conveyor is movable between a first position wherein the transfer conveyor is generally co-planar with the rails and a second position wherein the transfer conveyor is at a predetermined angle to the rails such that the transfer conveyor is generally co-planar with the lower conveyor when the rails and the transfer conveyor are in the second positions.

The transfer mechanism may include a rail locking mechanism which is movable between a locked position for locking the rails in the first position and a release position for allowing the rails to pivot between the first and second positions. A transfer conveyor locking mechanism is also provided. The transfer conveyor locking mechanism is movable between a locked position for locking the transfer conveyor in the first position and a release position for allowing the transfer conveyor to pivot between the first and second positions. A first counterweight is operatively connected to at least one of the rails for urging the rails towards the first position. A second counterweight is operatively connected to the transfer mechanism for urging the transfer conveyor towards the first position. A dampening mechanism is operatively connected to at least one of the rails for controlling movement of the rails between the first and second positions.

The transfer mechanism may also include a load restraining mechanism operatively connected to the upper conveyor. The load restraining mechanism is movable between a first position for retaining the load on the upper conveyor and a second position for allowing the load to be axially slid between the rails. The transfer conveyor also includes a plurality of rollers extending in the direction generally perpendicular to the rails. The rollers facilitate the positioning of a load onto and off of the transfer conveyor.

In accordance with a further aspect of the present invention, a transfer mechanism is provided for transferring a load between an upper conveyor extending along a first axis and a lower conveyor extending along the second axis, vertically displaced from the first axis. The transfer mechanism includes a support member having a first end adjacent to and pivotably mounted to the upper conveyor and an opposite second end. The support member is movable between a first position wherein the support member is generally parallel to the first axis and a second position wherein the support member is at a predetermined angle to the first axis. The transfer mechanism further includes a transfer deck having a first end pivotably mounted to the second end of the support member and a second opposite end. The transfer deck is movable between a first position wherein the transfer deck is co-planar with the support member and a second position wherein the transfer deck is at a predetermined angle to the support member. It is contemplated that the transfer deck extend generally along the second axis when the support member and the transfer deck are in the second positions.

The transfer mechanism may also include a support member locking mechanism and a transfer deck locking mechanism. The support member locking mechanism is movable between a locked position for locking the support member in the first position and a release position for allowing the support member to pivot between the first and second positions. The transfer deck locking mechanism is also movable between a locked position for locking the transfer deck in the first position and a release position for allowing the transfer deck to pivot between the first and second positions. A support member locking mechanism biasing element urges the support member locking mechanism towards the locked position. A transfer deck locking mechanism biasing element urges the transfer deck locking mechanism towards the locked position. The transfer mechanism also includes a first counterweight operatively connected to the support member for urging the support member towards the first position and a second counterweight operatively connected to the transfer deck for urging the transfer deck towards the first position. A dampening mechanism is operatively connected to the support member for controlling the rate of movement of the support member between the first and second positions. A load restraining mechanism is operatively connected to the upper conveyor. The load restraining mechanism is movable between a first position for retaining the load on the upper conveyor and a second position for allowing the load to be axially slid adjacent the support member.

In accordance with a still further aspect of the present invention, a transfer mechanism is provided for transferring a load between an upper conveyor extending along the first axis and a lower conveyor extending along a second axis which is vertically displaced from the first axis. The transfer mechanism includes first and second spaced, generally parallel rails having first ends adjacent to and pivotably mounted to the upper conveyor and opposite second ends. The rails are movable between a first position wherein the rails are generally parallel to the first axis and a second position wherein the rails are at a predetermined angle from the first axis. A rail locking mechanism is movable between a locked position for locking the rails in the first position and a release position for allowing the rails to pivot between the first and second positions. A first counterweight is operatively connected to at least one of the rails for urging the rails towards the first position. A transfer deck is also provided. The transfer deck includes a first end pivotably mounted to the second ends of the rails and a second opposite end. The transfer deck is a movable between a first position wherein the transfer deck is disposed between the rails and a second position wherein the transfer conveyor deck is at a predetermined angle to the rails. A transfer deck locking mechanism is movable between a locked position for locking the transfer deck in the first position and a release position for allowing the transfer deck to pivot between the first and second positions. A second counterweight is operatively connected to the transfer deck for urging the transfer deck towards the first position. It is contemplated that the transfer deck intersect the second axis when the rails from the transfer deck are in the second position.

A dampening mechanism may be operatively connected to at least one of the rails for controlling the rate of movement of the rails between the first and second positions. A load restraining mechanism is operatively connected to the upper conveyor. The load restraining mechanism is movable between the first position for retaining the load on the upper conveyor and the second position for allowing the load to be axially slid between the rails. A rail locking mechanism biasing element urges the rail locking mechanism towards the locked position and a transfer deck locking mechanism biasing element urges the transfer deck locking mechanism towards the locked position.

BRIEF DESCRIPTION OF THE DRAWINGS

The drawings finished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Referring to FIGS. 1–4, a transfer mechanism in accordance with the present invention is generally designed by the reference numeral 10. Transfer mechanism 10 is intended to transfer a load such as container 12 between an upper conveyor generally designated by the reference numeral 14, and a lower conveyor, generally designated by the reference numeral 16.

Transfer mechanism 10, upper conveyor 14, lower conveyor 16 are supported above a supporting surface 18 by a supporting frame 20. Support frame 20 includes pairs of end columns 22a and 22b interconnected by upper spaced beams 24a (FIG. 5) and 24b, and by lower spaced beams 26. Each of the end columns 22a and 22b include adjustable feet 28 which are telescopically received within the lower ends of end columns 22a and 22b so as to allow support frame 20 to be leveled with respect to supporting surface 18. Support frame 20 further includes a pair of intermediate columns 30 having upper ends interconnected to corresponding upper beams 24a and 24b and lower ends interconnected to corresponding lower beams 26.

Figure 5:
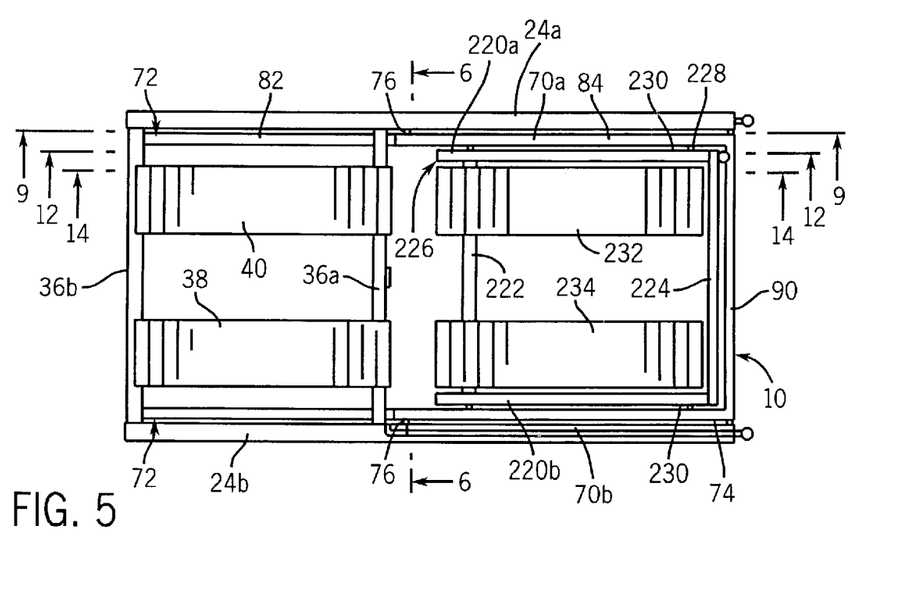
FIG. 5 is a top plan view of the transfer mechanism of the present invention taken along line 5—5 of FIG. 4.
Figure 6:
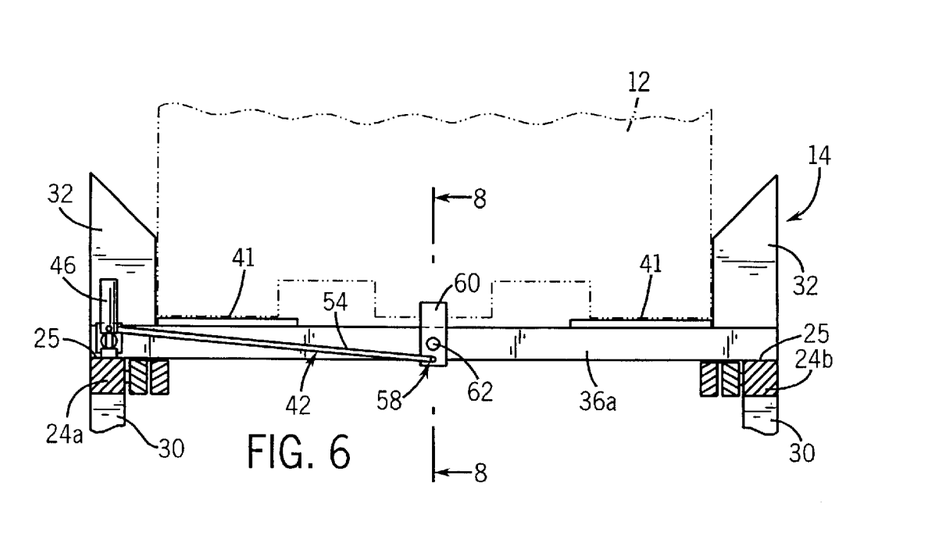
FIG. 6 is a cross-sectional view of the transfer mechanism of the present invention taken along line 6—6 of FIG. 5 showing a load retaining mechanism in a first load retaining position.

Referring to FIG. 6, upper conveyor 14 includes first and second generally parallel guide members 32 mounted on corresponding upper surfaces 25 of upper beams 24a and 24b. As best seen in FIG. 5, upper beams 24a and 24b are interconnected by spaced, forward and rearward cross beams 36a and 36b, respectively, which, in turn, support first and second roller sets 38 and 40, respectively, of parallelly extending rollers 41 (FIG. 8).

Figure 7:
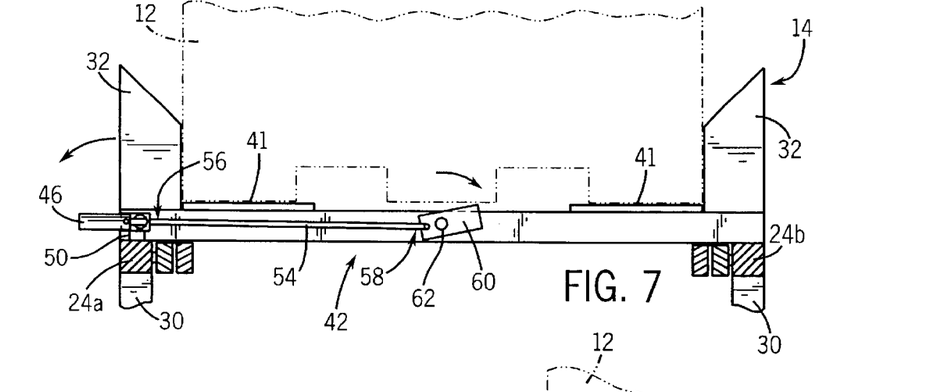
FIG. 7 is a cross-sectional view, similar to FIG. 6, showing the load retaining mechanism in a released position.
Figure 8:
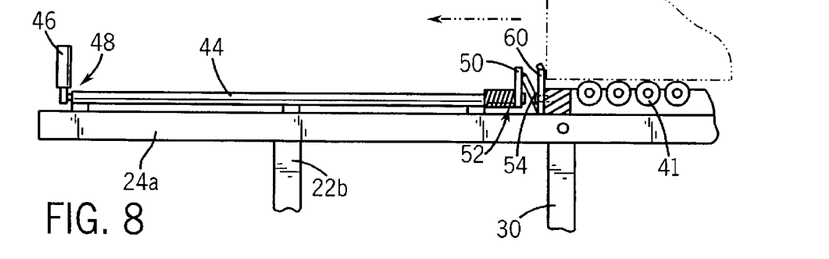
FIG. 8 is a cross-sectional view taken along line 8—8 of FIG. 6.

Referring to FIGS. 6–8, load retaining mechanism 42 is provided for maintaining load 12 on upper conveyor 14 and selectively preventing container 12 from axially sliding from roller sets 38 and 40 onto transfer mechanism 10. Load restraining mechanism 42 includes a first rod 44 extending along the upper surface 24a of one of the pair of upper beams 24a and 24b. Rod 44 includes a handle 46 mounted to a first end 48 thereof and a plate 50 rigidly mounted to an opposite second end 52 thereof. Load retaining mechanism 42 further includes a second rod 54 having a first end 56 interconnected to plate 50 and a second end rigidly connected to load restraining plate 60. Load restraining plate 60 is pivotably mounted to forward cross beam 36a by a pivot pin 62. With handle 46 in a first position, FIG. 6, load restraining plate 60 extends vertically from forward cross beam 36a so as to prevent container 12 from sliding axially (from right to left in FIG. 8) along roller sets 38 and 40 of rollers 41 onto transfer mechanism 10. By rotating handle 46 counterclockwise in FIGS. 6–7, plate 50 is rotated by rod 44 such that second rod 54 is drawn from right to left in FIGS. 6–7. As a result, load restraining plate 60 pivots on pivot pin 62 such that load restraining plate 60 is generally parallel to forward cross beam 36a and is out of interfering relationship with container 12, FIG. 7, thereby allowing container 12 to be slid axially along roller sets 38 and 40 of rollers 41 onto transfer mechanism 10.

Referring to FIGS. 1–4 and 14, lower conveyor 16 includes a pair of spaced lower conveyor rails 66 which extend from corresponding end columns 22a such that lower conveyor 16 is disposed below upper conveyor 14. Lower conveyor rails 66 support first and second roller sets 67 of rollers 41, for reasons hereinafter described.

As best seen in FIG. 5, transfer mechanism 10 includes a pair of spaced rails 70a and 70b having first and second opposite ends 72 and 74, respectively. Rails 70a and 70b are pivotably connected to corresponding upper beams 24a and 24b, respectively, by pivot pins 76. Rails 70a and 70b pivot between a first position, FIGS. 1 and 4, wherein the rails 70a and 70b are generally co-planar with upper conveyor 14 and a second position, FIGS. 2–3, wherein rails 70a and 70b are at a predetermined angle to upper conveyor 14. It is contemplated that in the second position, FIGS. 2–3, rails 70a and 70b be at an angle, e.g. 45 degrees, with respect to supporting surface 18 so as to allow container 12 to be in an ergometrically friendly position, as hereinafter described. Rails 70a and 70b are retained in the first position by pin structures 80 (FIG. 10), as hereinafter described.

Rails 70a and 70b have first portions 82 adjacent the first ends 72 thereof and second portions 84 adjacent second ends 74 thereof. First and second portions 82 and 84 are at predetermined angles with respect to each other. Counterweights 86 are mounted to first portions 82 of rails 70a and 70b so as to urge rails 70a and 70b towards the first position, FIGS. 1 and 4.

Figure 10:
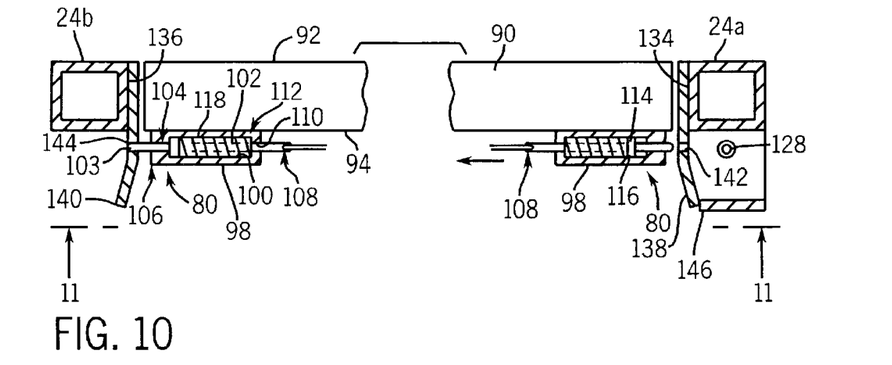
FIG. 10 is a cross-sectional view taken along line 10—10 of FIG. 9.
Figure 11:
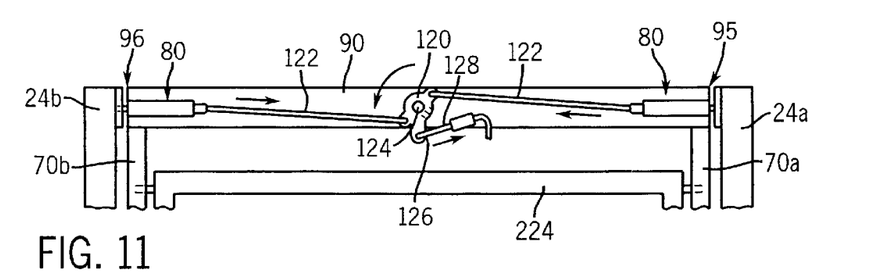
FIG. 11 is a cross-sectional view taken along line 11—11 of FIG. 10.

Referring to FIGS. 10–11, first ends 74 of rails 70a and 70b are interconnected by cross beam 90. Cross beam 90 includes an upper surface 92 and a lower surface 94. Pin structures 80 are mounted onto lower surface 94 at opposite ends 95 and 96 of cross beam 90 adjacent corresponding ends 74 of rails 70a and 70b, respectively. Each pin structure 80 includes a pin housing 98 having an inner surface 100 defining a generally cylindrical chamber therein. A pin member 102 is slidably received within the chamber in pin housing 98. Pin member 102 includes a first end 103 which projects through a corresponding opening 104 in a first end 106 of pin housing 98 and a second opposite end 108 which projects through an opening 110 in a second opposite end 112 of pin housing 98. A flange 114 projects radially from pin member 102 and includes a radially outer surface 116 which engages the inner surface 100 of pin housing 98 and forms a slidable interface therewith. A spring 118 is disposed within the chamber within pin housing 98 so as to engage flange 114 and urge flange 114 away from second end 112 of pin housing 98.

Second ends 108 of pin members 102 of pin structures 80 are interconnected to connection bracket 120 by cables 122. Connection bracket 120 is pivotably mounted to the lower surface 94 of cross beam 90 by a pivot pin 124. Connection bracket 120 is further connected to a first end 126 of a push/pull cable 128. Second end 130 of push/pull cable 128 is interconnected to a handle 132 (FIG. 12).

Figure 9:
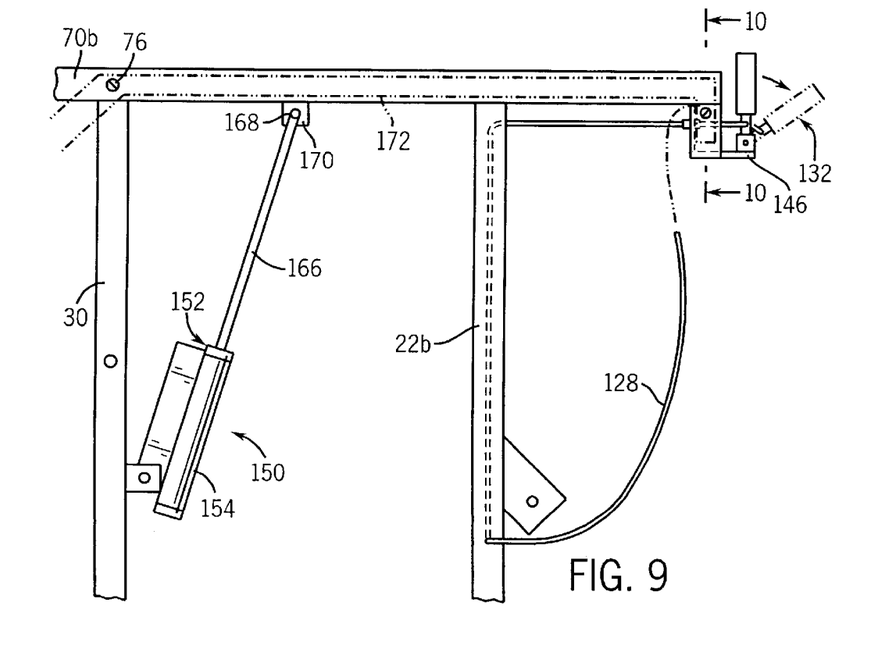
FIG. 9 is a cross-sectional view taken along line 9—9 of FIG. 5.

Upper beams 24a and 24b include corresponding inwardly directed surfaces 134 and 136, respectively. Mounting brackets 138 and 140 are affixed to corresponding inner surfaces 134 and 136, respectively, of upper beams 24a and 24b, respectively. Mounting brackets 138 and 140 include corresponding openings 142 and 144, respectively, which are axially aligned with pin members 102 of corresponding pin structures 80. Mounting bracket 138 includes a generally horizontal handle supporting portion 146 interconnected thereto. Handle 132 is pivotably mounted to handle support portion 146 such that handle 132 is movable between a first non-release position, FIG. 9, and a second release position, shown in phantom in FIG. 9. As described, with the handle in the first position, second ends 108 of pin members 102 of pin structures 80 fully extend from the second end 110 of pin housing 98. By pivoting handle 132 to the release position, push/pull cable 128 rotates connection bracket 120 on pivot pin 124 so as to retract pin members 102 within pin housings 98 through cables 122 and to allow rails 70a and 70b to pivot on pivot pins 76.

Figure 12:
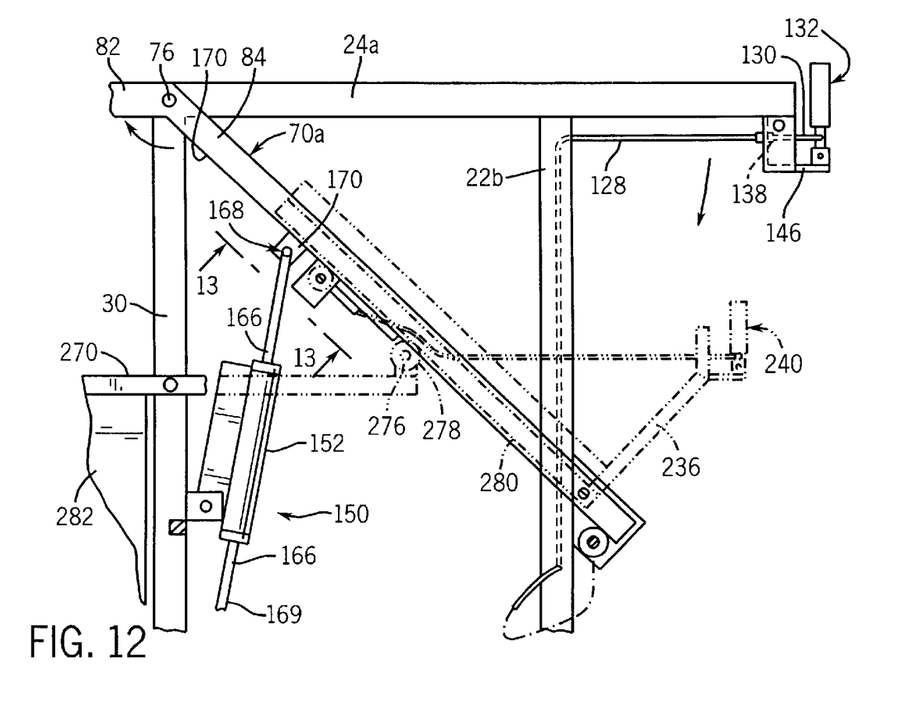
FIG. 12 is a cross-sectional view taken along line 12—12 of FIG. 5.
Figure 15:
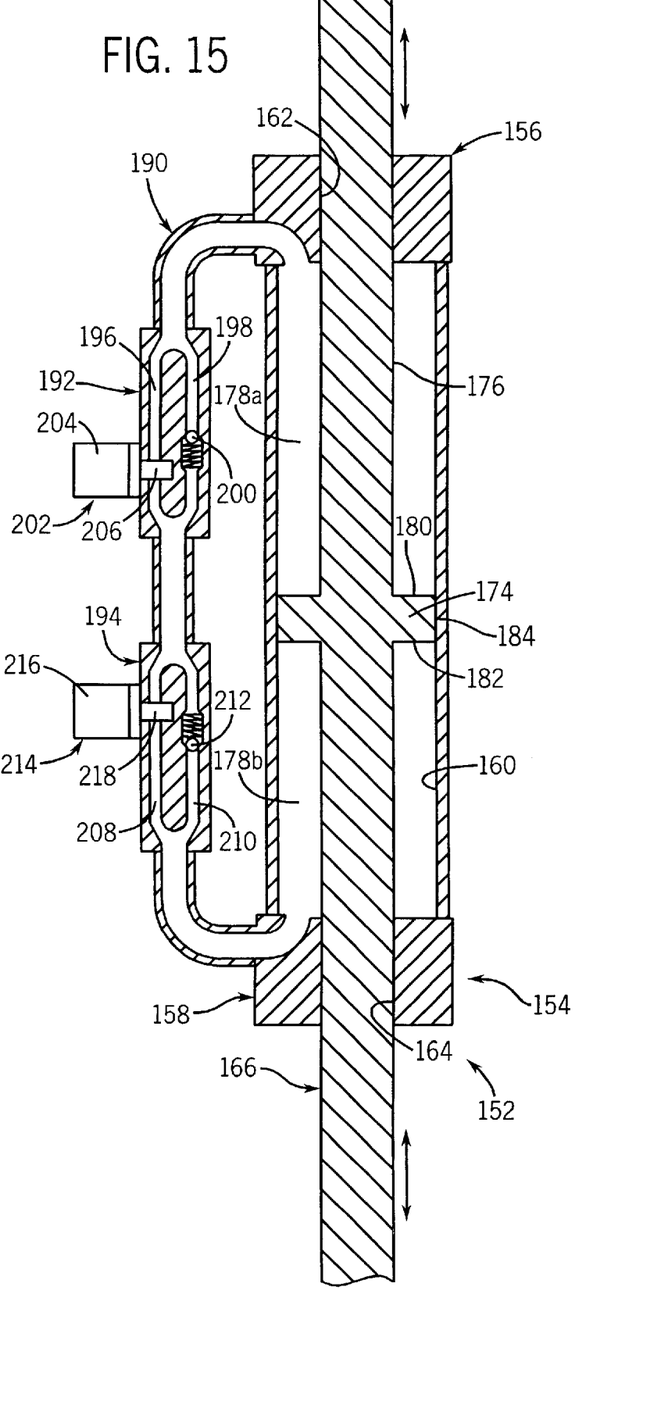
FIG. 15 is a cross-sectional view of a dampening mechanism of the transfer mechanism of the present invention.

As best seen in FIG. 12, rail 70b is interconnected to one of the intermediate columns 30 by a cylinder assembly generally designated by the reference numeral 150. Cylinder assembly 150 includes a dampening cylinder 152 pivotably mounted to one of the intermediate columns 30. Dampening cylinder 152 includes cylinder housing 154 having first and second opposite ends 156 and 158, respectively. Referring to FIG. 15, cylinder housing 154 includes an inner surface 160 defining a chamber therein. Ends 156 and 158 of cylinder housing 154 includes corresponding openings 162 and 164 therein which are axially aligned with each other. A piston rod 166 extends through openings 162 and 164 in cylinder housing 154. Piston rod 166 includes a first end 168 pivotably mounted to a mounting flange 170 depending from the underside 172 of rail 70b and a second opposite end 169.

Piston rod 166 further includes a flange 174 projecting radially from the outer surface 176 thereof and disposed within the chamber of cylinder housing 154. Flange 174 divides the chamber within cylinder housing 154 into a first portion 178a and a second portion 178b. Flange 174 is defined by a first surface 180 which is directed towards first portion 178a of the chamber within cylinder housing 154 and a second surface 182 directed towards the second portion 178b of the chamber within cylinder housing 154. First and second surfaces 180 and 182, respectively, of flange 174 are interconnected by a radially outer end surface 184 which forms a slidable interface with the inner surface 160 of cylinder housing 154.

First and second portions 178a and 178b, respectively, of the chamber within cylinder housing 154 are interconnected by a conduit 190. Conduit 190 includes first and second flow control valves 192 and 194, respectively, which control the flow of fluid between first and second portions 178a and 178b, respectively, of the chamber within cylinder housing 154. Flow control valve 192 includes first and second parallel passages 196 and 198, respectively, therethrough. Check valve 200 is disposed in second passage 198 so as to allow fluid exiting first portion 178a of the chamber in cylinder housing 154 to flow therethrough and to prevent fluid exiting second portion 178b of chamber in cylinder housing 154 to flow therepast. Flow control valve 192 further includes a flow regulator 202. Flow regulator 202 includes an enlarged end 204 having a shaft 206 projecting therefrom. Shaft 206 extends into passage 196 such that by rotating enlarged head 204 of flow regulator 202, shaft 206 moves into and out of interfering relationship with passage 196 so as to control the flow of fluid therepast.

Similarly, flow control valve 194 includes first and second parallel passages 208 and 210, respectively, therethrough. Check valve 212 is disposed in second passage 210 so as to allow fluid exiting second portion 178b of the chamber in cylinder housing 154 to flow therethrough and to prevent fluid exiting first portion 178a of the chamber in cylinder housing 154 to flow therepast, Flow control valve 194 further includes a flow regulator 214. Flow regulator 214 includes an enlarged head 216 having a shaft 218 projecting therefrom. Shaft 218 extends into passage 208 such that by rotating enlarged head 216 of flow regulator 214, shaft 218 moves into and out of interfering relationship with passage 208 so as to control the flow of fluid therepast.

Figure 1:
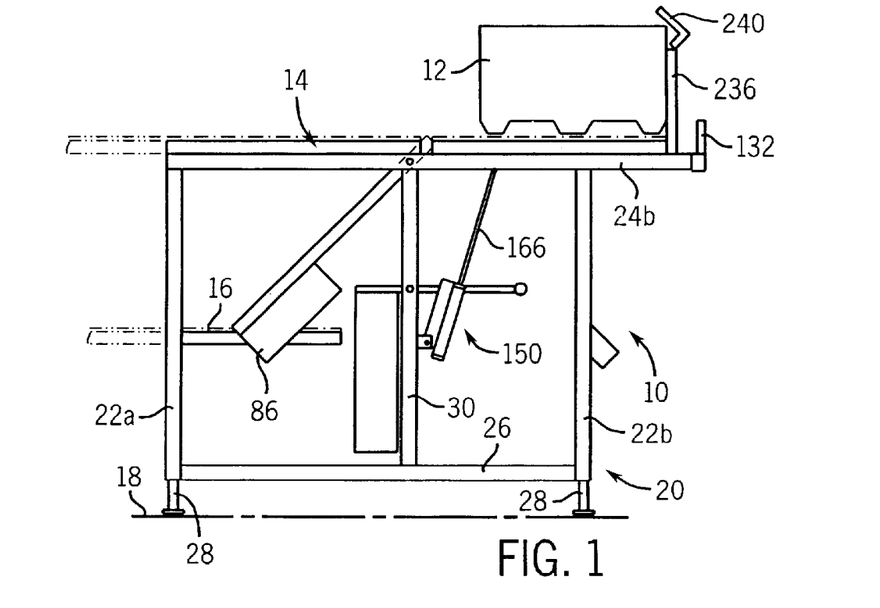
FIG. 1 is a side elevational view of a transfer mechanism in accordance with the present invention showing the transfer mechanism in a first loading position.
Figure 2:
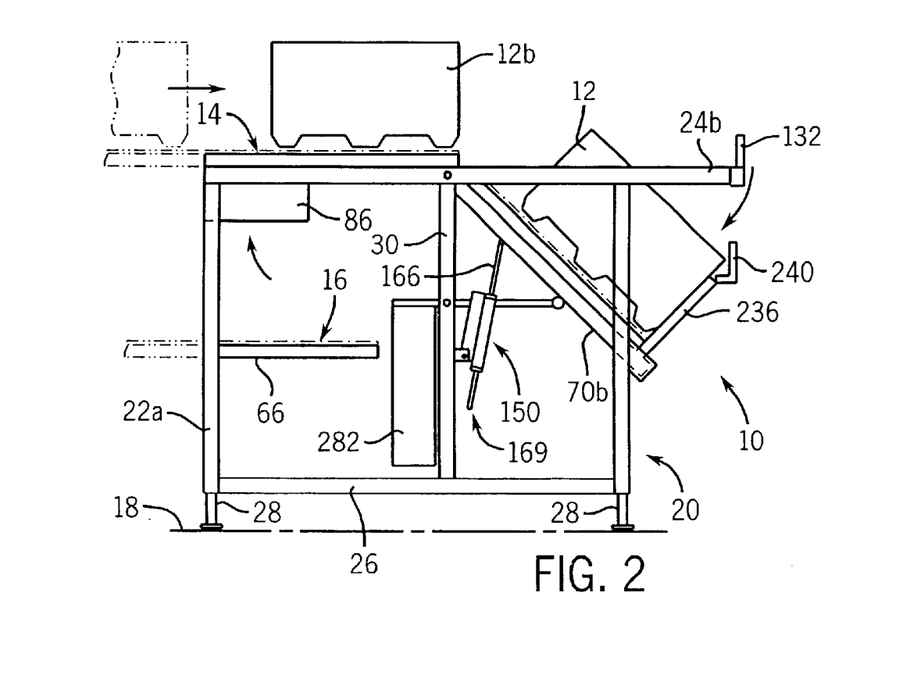
FIG. 2 is a side elevational view of the transfer mechanism of the present invention showing the transfer mechanism in an intermediate loading position.
Figure 3:
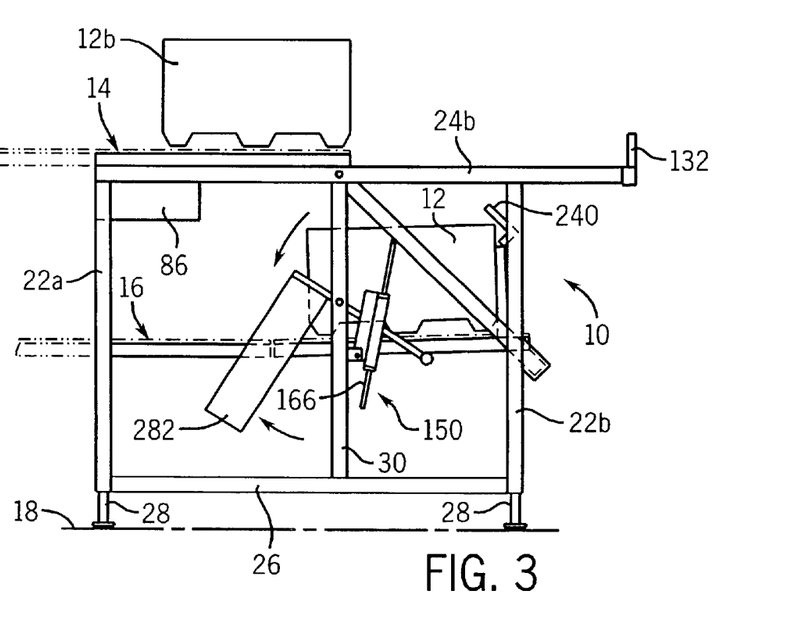
FIG. 3 is a side elevational view showing the transfer mechanism of the present invention showing the transfer mechanism in a third, transferred position.
Figure 4:
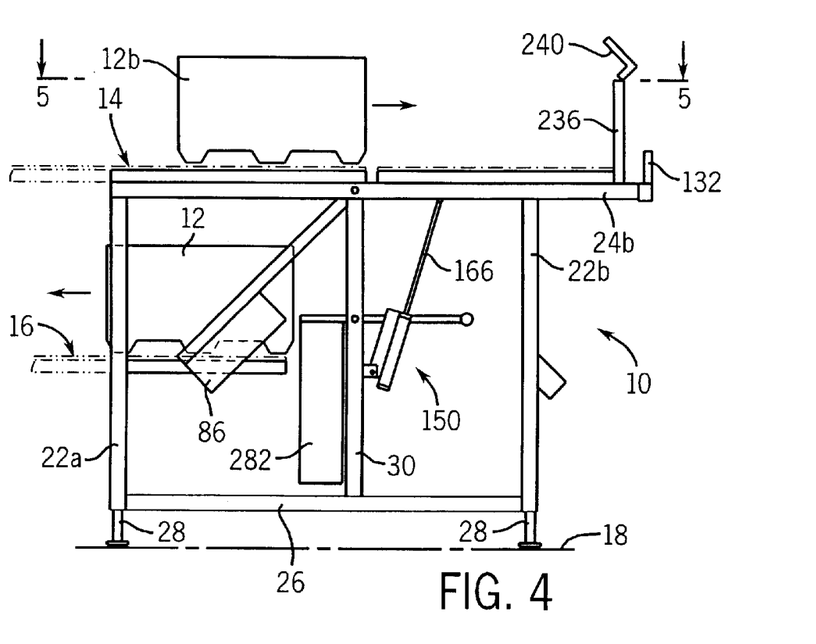
FIG. 4 is a side elevational view, similar to FIG. 1, showing the transfer mechanism of the present invention in the first, loading position.

As rails 70a and 70b pivot from the first position, FIGS. 1 and 4, to the second position, FIGS. 2–3, piston rod 166 slides axially (downwardly in FIG. 15) through cylinder housing 154. As piston rod 166 is urged downwardly in FIG. 15, fluid within second portion 178b of the chamber in cylinder housing 154 is urged therefrom by flange 174. The fluid exiting second portion 178b of the chamber in cylinder housing 154 flows through flow control valve 194 past shaft 218 of flow regulator 214 in first passage 208 and past check valve 212 disposed in second passage 210. The flow of fluid through first passage 208 is limited by the portion of shaft 218 in interfering relationship with passage 208.

As the fluid is urged towards flow control valve 192 by flange 174 of piston rod 166, the fluid enters first and second passages 196 and 198, respectively, of flow container valve 192. Check valve 200 disposed in second passage 198 prevents fluid from flowing therepast. As a result, all of the fluid must flow through first passage 196 through flow control valve 192. As such, the portion of shaft 206 within first passage 196 controls the flow of fluid through flow control valve 192. A user may rotate enlarged head 204 of flow regulator 202 in order to control the rate of fluid flowing through flow control valve 192. The flow rate of the fluid through flow control valve 192 controls the rate of movement of the piston rod 166 through cylinder housing 154 which, in turn, controls the rate at which the rails 70a and 70b move between the first position, FIGS. 1 and 4, and the second position, FIGS. 2–3.

Alternatively, as rail 70a and 70b pivot from the second position, FIGS. 2–3, to the first position, FIGS. 1 and 4, piston rod 166 slides axially (upwardly in FIG. 15) through cylinder housing 154 in an opposite direction. As piston rod 166 is urged upwardly in FIG. 15 by counterweight 86, fluid within the first portion 178a of the chamber in cylinder housing 154 is urged therefrom by flange 174. The fluid exiting first portion 178a of the chamber in cylinder housing 154 flows through flow control valve 192 past shaft 206 of flow regulator 202 in first passage 196 and past check valve 200 disposed in second passage 198. The flow of fluid through first passage 196 is limited by the portion of shaft 206 in interfering relationship with passage 196.

As the fluid is urged towards flow control valve 194 by flange 174 of piston rod 166, the fluid enters first and second passages 208 and 210, respectively, of flow control valve 194. Check valve 212 disposed in second passage 210 prevents fluid from flowing therepast. As a result, all of the fluid must flow through first passage 208 through flow control valve 194. As such, the portion of shaft 218 within first passage 208 controls the flow of fluid through control valve 194. A user may rotate enlarged head 216 of flow regulator 214 in order to vary the portion of shaft 218 in passage 208 of flow control valve 194 so as to control the rate of fluid flowing therethrough. The flow rate of the fluid through flow control valve 194 controls the rate of movement of piston rod 166 through cylinder housing 154 which, in turn, controls the rate at which the rails 70a and 70b move between the second position, FIGS. 2–3, and the first position, FIGS. 1 and 4. It can be appreciated that flow control valves 192 and 194 may be used to optimize the rate at which rails 70a and 70b move between the first and second positions.

Referring back to FIG. 5, transfer mechanism 10 further includes inner rails 220a and 220b, respectively, interconnected by cross beams 222 and 224. Cross beams 222 and 224 support first and second roller sets 232 and 234, respectively, of parallelly extending rollers 41. Inner rails 220a and 220b have first and second opposite ends 226 and 228, respectively, and are pivotably mounted adjacent second ends 228 thereof to corresponding rails 70a and 70b, respectively, by pivot pins 230. Inner rails 220a and 220b are pivotable on corresponding pivot pins 230 between a first position, FIGS. 1–2 and 4 wherein inner rails 220a and 220b are generally co-planar with rails 70a and 70b and a second position, FIG. 3, wherein inner rails 220a and 220b are at a predetermined angle to rails 70a and 70b. Inner rails 220a and 220b are retained in the first position by pin structures 80 as hereinafter described.

Figure 14:
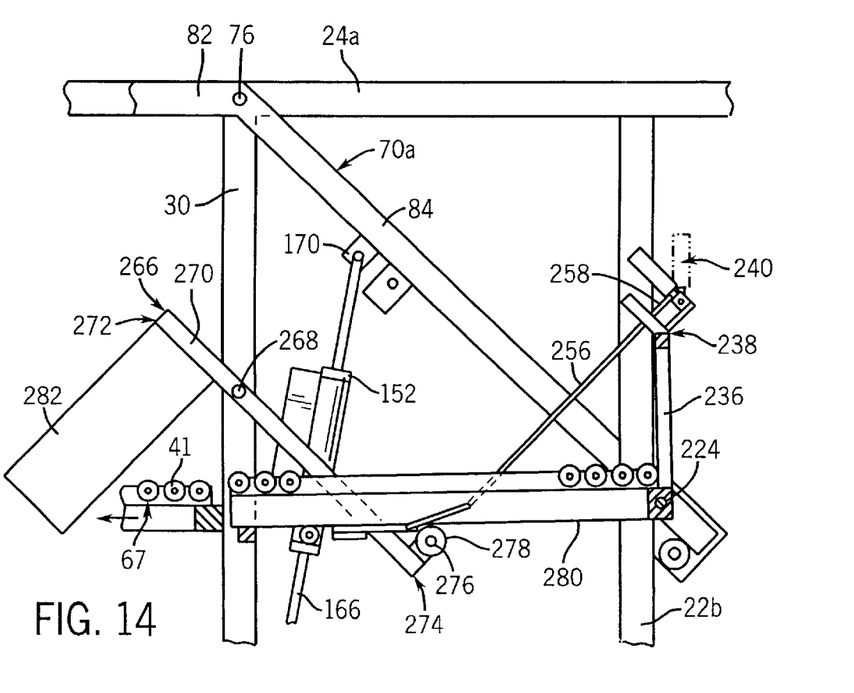
FIG. 14 is a cross-sectional view taken along line 14—14 of FIG. 5.

As best seen in FIG. 14, cross beam 224 includes a stop member 236 projecting therefrom perpendicular to inner rails 220a and 220b. As best seen in FIGS. 1–2, stop member 236 is intended to retain container 12 on transfer mechanism 10 as rails 70a and 70b are pivoted between the first and second positions. Stop member 236 includes a terminal end 238 having a handle 240 mounted thereto, for reasons hereinafter described.

Figure 13:
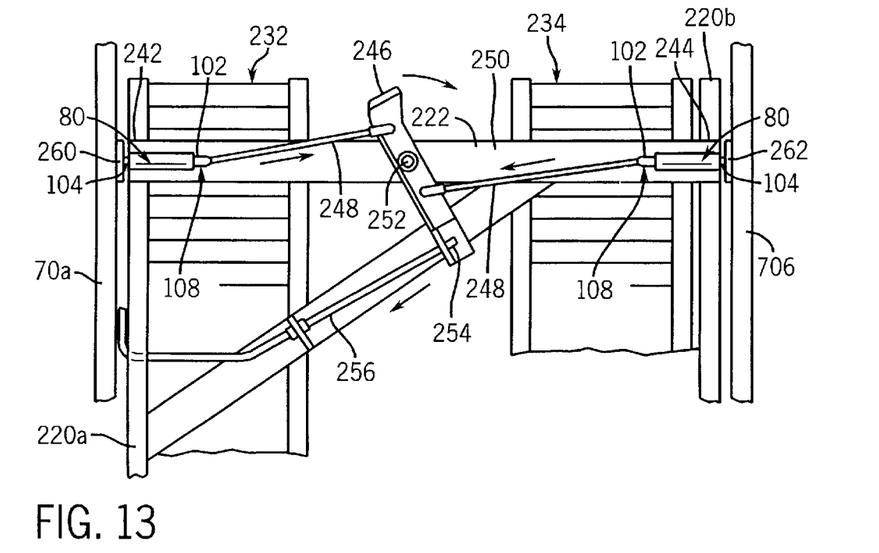
FIG. 13 is a cross-sectional view taken along line 13—13 of FIG. 12.

Referring to FIGS. 13–14, pin structures 80 are mounted on opposite ends 242 and 244 of lower surface 250 of cross beam 222 adjacent corresponding ends 226 of rails 220a and 220b, respectively. Second ends 108 of pin members 102 of pin structures 80 are interconnected to connection bracket 246 by cables 248. Connection bracket 246 is pivotably mounted to the lower surface 250 of cross beam 222 by a pivot pin 252. Connection bracket 246 is further connected to a first end 254 of a push-pull cable 256. Second end 258 of push-pull cable 256 is interconnected to handle 240, FIG. 14.

Rails 70a and 70b include corresponding reinforced openings 260 and 262, respectively, which are axially aligned with pin members 102 of corresponding pin structures 80 mounted to lower surface 250 of cross beam 222. Handle 240 is movable between a first non-release position and a second release position, shown in phantom in FIG. 14. With handle 240 in the non-release position, second ends 108 of pin members 102 of pin structures 80 extend from second end 112 of pin housing 98 so as to allow second ends 108 of pin members 102 to be received within corresponding reinforced openings 260 and 262 in rails 70a and 70b, respectively. By pivoting handle 240 to the release position, push-pull cable 256 rotates connection bracket 246 on pivot pin 252 so as to retract pin members 102 within pin housing 98 through cables 248 thereby allowing inner rails 220a and 220b to pivot on corresponding pivot pins 230.

Counterweight structures 266 are pivotably mounted to corresponding intermediate columns 30 by pivot pins 268. Each counterweight structure 266 includes a support shaft 270 having first and second opposite ends 272 and 274, respectively. Rollers 276 are rotatably mounted on second ends 274 of support shafts 270. Rollers 276 include outer peripheral surfaces 278 which engage the underside 280 of corresponding inner rails 220a and 220b, respectively. Counterweights 282 are mounted to second ends 272 of support rod 270. Counterweights 282 urge support shafts 270 to pivot counterclockwise on pivot pins 268. As such, rollers 276 roll along the underside 280 of corresponding inner rails 220a and 220b so as to urge inner rails 220a and 220b toward the first position.

In operation, a container 12 is deposited on upper conveyor 14. Handle 46 of load retaining mechanism 42 is pivoted from the first position, FIG. 6, to the second position, FIG. 7, such that load restraining plate 60 is out of interfering relationship with container 12. Container 12 is slid from roller sets 38 and 40 onto roller sets 232 and 234 of transfer mechanism 10. Handle 46 is returned to the first position, FIG. 6, wherein load restraining plate 60 extends vertically from forward cross beam 36a so as to prevent container 12 from sliding axially back onto to roller sets 38 and 40. A second container 12b, FIG. 2, is positioned on upper conveyor 14 and maintained thereon by load restraining plate 60. Handle 132 is moved from the non-release to the release position so as to allow rails 70a and 70b to pivot towards the second position. The weight of container 12 urges rails 70a and 70b from the first to the second position against the bias of counterweights 86. As heretofore described, the rate at which rails 70a and 70b pivot between the first position, FIGS. 1 and 4, and the second position, FIGS. 2–3, is controlled by cylinder assembly 150, as heretofore described.

With rails 70a and 70b in the second position, container 12 is in an ergometrically friendly position whereby an individual may load or unload product into container 12, FIG. 2. Upon completion of such task, handle 240 is moved between the first non-release position to the release position so as to allow inner rails 220a and 220b to pivot to the second position, FIG. 3. Container 12 is slid from roller sets 232 and 234 onto roller sets 67 on lower conveyor 66. Container 12 is thereafter transported by conveyor or other suitable means to a different locale within a factory.

With container 12 deposited on lower conveyor 16, counterweights 282 urge inner rails 220a and 220b toward the first position as heretofore described. With inner rails 220a and 220b in the first position, handle 240 is returned to the non-release position such that pin structures 80 mounted to lower surface 250 of cross beam 222 interconnect inner rails 220a and 220b to corresponding rails 70a and 70b, respectively. Thereafter, counterweight 86 urges rails 70a and 70b toward the first position, FIG. 4. The rate at which rails 70a and 70b move from the second position, FIG. 3, to the first position, FIG. 4, is controlled by cylinder assembly 150, as heretofore described. With rails 70a and 70b in the first position, FIG. 4, handle 132 is returned to the non-release position, FIG. 9, such that pin structures 80 mounted to cross beam 90 interconnect rails 70a and 70b to corresponding upper beams 24a and 24b, respectively, as heretofore described. The operation heretofore described may be repeated utilizing second container 12b.

Figure 16:
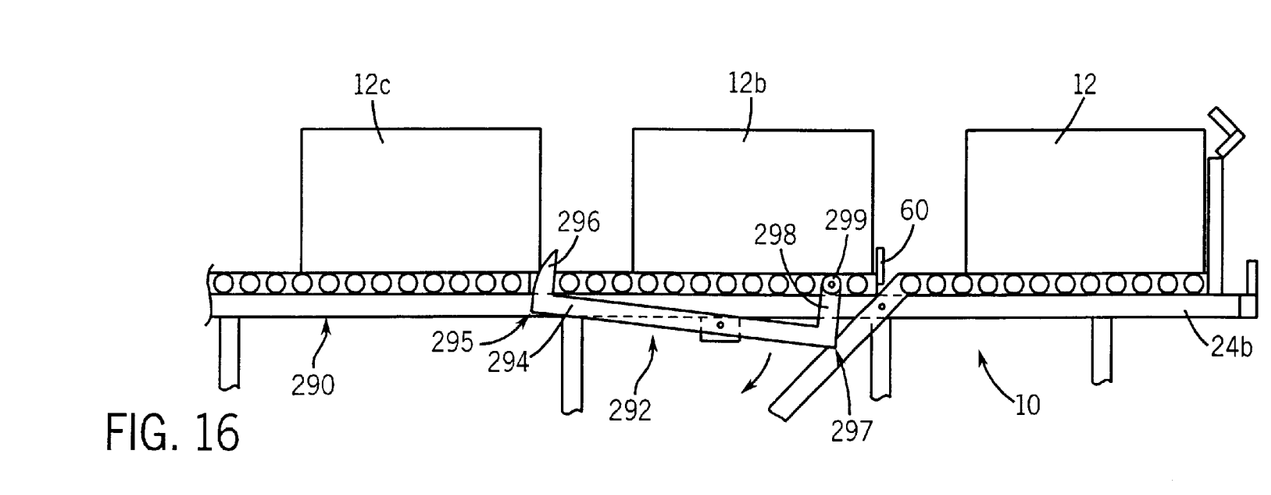
FIG. 16 is a side elevational view of an upper conveyor for use with the transfer mechanism of the present invention.
Figure 17:
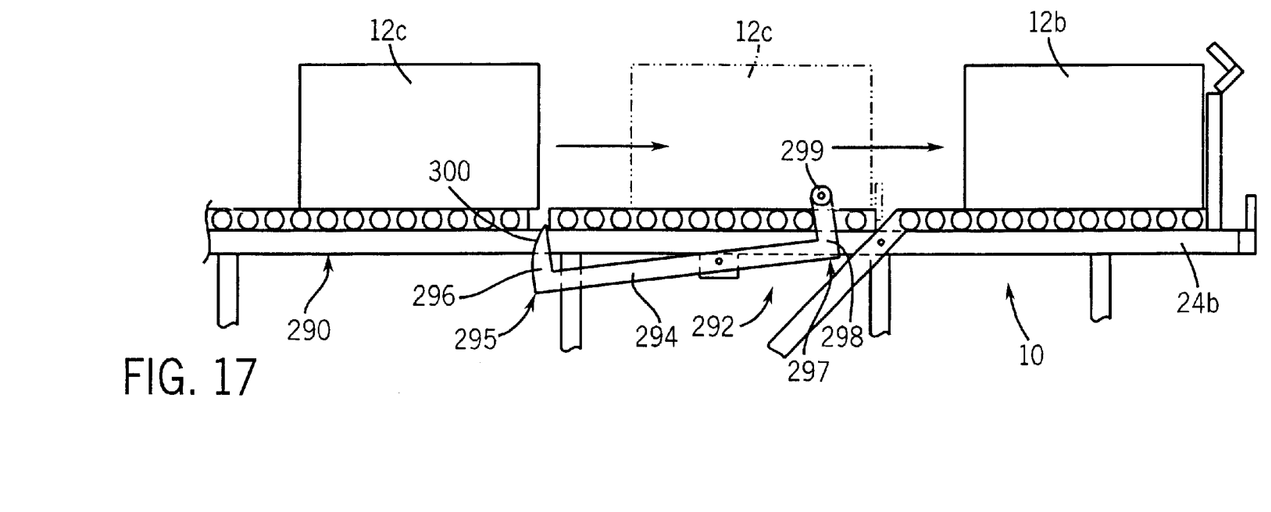
FIG. 17 is a side elevational view, similar to FIG. 16, showing an upper conveyor for use with the transfer mechanism of the present invention.

Referring to FIGS. 16 and 17, an alternate upper conveyor is generally designed by the reference numeral 290. It is contemplated that upper conveyor 290 may be used in connection with transfer mechanism 10 of the present invention. Upper conveyor 290 includes a flip-flop assembly designated by the reference numeral 292 for controlling the flow of containers 12, 12b and 12c from upper conveyor 290 to transfer mechanism 10. Flip-flop assembly 292 includes support 294 which is pivotably mounted to upper beam 24b. Support 294 includes a first end 295 having a stop 296 projecting therefrom and a second, opposite end 297 having a vertical arm 298 projecting therefrom. A roller 299 is mounted on the terminal end of vertical leg 298 of flip-flop assembly 292.

Flip-flop assembly 292 is pivotable between a first position, FIG. 17, wherein vertical arm 298 of flip-flop assembly 292 projects through rollers 41 of upper conveyor 290 into the path of containers 12, 12b and 12c, and a second position wherein stop member 296 projects through rollers 41 of upper conveyor 290 into the path of containers 12, 12b and 12c. It is contemplated to pivotably connect support 294 of flip-flop assembly 292 to upper beam 24b at a location closer to second end 297 of support 294 such that flip-flop assembly 292 is urged towards the first position, FIG. 17.

In operation, with container 12 positioned on transfer mechanism 10, conveyors 12b and 12c are positioned on upper conveyor 290. Container 12b rests on roller 299 of vertical leg 298 of flip-flop assembly 292 and is maintained in such position by load restraining plate 60 of load retaining mechanism 42. Stop member 296 on first end 295 of support 294 projects through upper conveyor 290 such that container 12c is maintained in an axially spaced relationship from container 12b.

After container 12 is deposited on lower conveyor 16 and transfer mechanism is returned to its original position, FIG. 4, as heretofore described, handle 46 is moved from the first position, FIG. 6, to the second position, FIG. 7, so as to allow container 12b to be slid axially onto transfer mechanism 10. With container 12b on transfer mechanism 10, flip-flop assembly 292 pivots from the second position, FIG. 16, to the first position, FIG. 17, such that stop member 296 on first end 295 of support 294 moves out of interfering relationship with container 12c. It is contemplated that stop member 296 include a generally arcuate end surface 300 directed towards container 12c so as to facilitate the pivoting of flip-flop assembly 292 from the second position, FIG. 16, to the first position, FIG. 17.

Handle 46 is returned to the first position such that load restraining plate 60 projects vertically from forward cross beam 36a. In addition, with stop member 296 out of interfering relationship with container 12c, container 12c slides axially (from left to right in FIG. 17) towards engagement with load restraining plate 60 of load retaining mechanism 42. As container 12c engages roller 299 at the terminal end of vertical leg 298 of flip-flop assembly 292, container 12c urges flip-flop assembly 292 to the second position, FIG. 16, such that stop member 296 is in interfering relationship with the next, subsequent container on upper conveyor 290. In such a manner, flip-flop assembly 292 provides spacing between consecutive containers 12.

Various modes of carrying out the invention are contemplated as being within the scope of the following claims particularly pointing out and distinctly claiming the subject matter which is regarded as the invention.

I claim:

1. A transfer mechanism for transferring a load between a first upper conveyor and a second lower conveyor, comprising:

first and second spaced, generally parallel rails having first ends pivotably mounted to the upper conveyor and opposite second ends, the rails movable between a first position wherein the rails are generally co-planer with the upper conveyor and a second position wherein the rails extend from the upper conveyor at a predetermined angle; and a transfer conveyor having a first end pivotally mounted to the second ends of the rails and a second opposite end, the transfer conveyor movable between a first position wherein the transfer conveyor is generally co-planer with the rails and a second position wherein the transfer conveyor is at a predetermined angle to the rails such that transfer conveyor is generally co-planer with the lower conveyor when the rails and the transfer conveyor are in the second positions.

2. The transfer mechanism of claim 1 farther comprising a rail locking mechanism movable between a lock position for locking the rails in the first position and a release position for allowing the rails to pivot between the first and second positions.

3. The transfer mechanism of claim 1 further comprising a transfer conveyor locking mechanism movable between a lock position for locking the transfer conveyor in the first position and a release position for allowing the transfer conveyor to pivot between the first and second positions.

4. The transfer mechanism of claim 1 further comprising a counterweight operatively connected to at least one of the rails for urging the rails towards the first position.

5. The transfer mechanism of claim 1 further comprising a counterweight operatively connected to the transfer conveyor for urging the transfer conveyor towards the first position.

6. The transfer mechanism of claim 1 further comprising a dampening mechanism operatively connected to at least one of the rails for controlling the rate of movement of the rails between the first and the second positions.

7. The transfer mechanism of claim 1 further comprising a load restraining mechanism operatively connected to the upper conveyor, the load restraining mechanism movable between a first position for retaining the load on the upper conveyor and a second position for allowing the load to be axially slid between the rails.

8. The transfer mechanism of claim 1 wherein the transfer conveyer includes a load stopping member projecting from the second end thereof, the load stopping member preventing the load from sliding axially off the transfer conveyer.

9. The transfer mechanism of claim 1 wherein the transfer conveyor includes a plurality of rollers extending in a direction generally perpendicular to the rails, the rollers facilitating the positioning of the load onto and off of the transfer conveyor.

10. A transfer mechanism for transferring a load between an upper conveyor extending along a first axis and a lower conveyor extending along a second axis, vertically displaced from the first axis, the transfer mechanism comprising:

a support member having a first end adjacent to and pivotably mounted to the upper conveyor and an opposite second end, the support member movable between a first position wherein the support member is generally parallel to the first axis and a second position wherein the support member is at a predetermined angle to the first axis; and a transfer deck having a first end pivotably mounted to the second end of the support member and a second opposite end, the transfer deck movable between a first position wherein the transfer deck is co-planer with the support member and a second position wherein the transfer deck is at a predetermined angle to the support member.

11. The transfer mechanism of claim 10 wherein the transfer deck extends generally along the second axis when the support member and the transfer deck are in the second positions.

12. The transfer mechanism of claim 10 further comprising:

a support member locking mechanism movable between a lock position for locking the support member in the first position and a release position for allowing the support member to pivot between the first and second positions; and a transfer deck locking mechanism movable between a lock position for locking the transfer deck in the first position and a release position for allowing the transfer deck to pivot between the first and second positions.

13. The transfer mechanism of claim 12 further comprising a support member locking mechanism biasing element for urging the support member locking mechanism towards the lock position; and a transfer deck locking mechanism biasing element for urging the transfer deck locking mechanism towards the lock position.

14. The transfer mechanism of claim 10 further comprising:

a first counterweight operatively connected to the support member for urging the support member towards the first position; and a second counterweight operatively connected to the transfer deck for urging the transfer deck towards the first position.

15. The transfer mechanism of claim 10 further comprising a dampening mechanism operatively connected to the support member for controlling the rate of movement of the support member between the first and the second positions.

16. The transfer mechanism of claim 10 further comprising a load restraining mechanism operatively connected to the upper conveyor, the load restraining mechanism movable between a first position for retaining the load on the upper conveyor and a second position for allowing the load to be axially slid adjacent the support member.

17. A transfer mechanism for transferring a load between an upper conveyor extending along a first axis and a lower conveyor extending along a second axis, vertically displaced from the first axis, the transfer mechanism comprising:

first and second spaced, generally parallel rails having first ends adjacent to and pivotably mounted to the upper conveyor and opposite second ends, the rails movable between a first position wherein the rails are generally parallel to the first axis and a second position wherein the rails are at a predetermined angle to the first axis;

a rail locking mechanism movable between a lock position for locking the rails in the first position and a release position for allowing the rails to pivot between the first and second positions;

a first counterweight operatively connected to at least one of the rails for urging the rails towards the first position;

a transfer deck having a first end pivotably mounted to the second ends of the rails and a second opposite end, the transfer deck movable between a first position wherein the transfer deck is disposed between the rails and a second position wherein the transfer deck is at a predetermined angle to the rails;

a transfer deck locking mechanism movable between a lock position for locking the transfer deck in the first position and a release position for allowing the transfer deck to pivot between the first and second positions; and a second counterweight operatively connected to the transfer deck for urging the transfer deck towards the first position.

18. The transfer mechanism of claim 17 wherein the transfer deck intersects the second axis when the rails and the transfer deck are in the second positions.

19. The transfer mechanism of claim 17 further comprising a dampening mechanism operatively connected to at least one of the rails for controlling the rate of movement of the rails between the first and the second positions.

20. The transfer mechanism of claim 17 further comprising a load restraining mechanism operatively connected to the upper conveyor, the load restraining mechanism movable between a first position for retaining the load on the upper conveyor and a second position for allowing the load to be axially slid between the rails.

21. The transfer mechanism of claim 17 further comprising a rail locking mechanism biasing element for urging the rail locking mechanism towards the lock position; and a transfer deck locking mechanism biasing element for urging the transfer deck locking mechanism towards the lock position.

* * * * *